US012573194B2

(12) United States Patent
Perugupalli et al.

(10) Patent No.: US 12,573,194 B2
(45) Date of Patent: Mar. 10, 2026

(54) SYSTEMS AND METHODS FOR AUGMENTED VISUALIZATION USING ACTIVITY WINDOWS

(71) Applicant: Pramana, Inc., Cambridge, MA (US)

(72) Inventors: Prasanth Perugupalli, Cary, NC (US); Prateek Jain, Karnataka (IN); Christopher Goel, Cambridge, MA (US); Bharathwaj Raghunathan, Oakville (CA)

(73) Assignee: Pramana, Inc., Cambridge, MA (US)

( * ) Notice: Subject to any disclaimer, the term of this patent is extended or adjusted under 35 U.S.C. 154(b) by 0 days.

(21) Appl. No.: 18/660,007

(22) Filed: May 9, 2024

(65) Prior Publication Data

US 2025/0349120 A1 Nov. 13, 2025

(51) Int. Cl.
*G06T 7/00* (2017.01)
*G06T 7/11* (2017.01)
(Continued)

(52) U.S. Cl.
CPC .......... *G06V 10/945* (2022.01); *G06T 7/0012* (2013.01); *G06T 7/11* (2017.01); *G06T 11/00* (2013.01); *G06V 20/698* (2022.01); *G06V 20/70* (2022.01); *G06T 2200/24* (2013.01); *G06T 2207/20081* (2013.01); *G06T 2207/20084* (2013.01); *G06T 2207/20104* (2013.01); *G06T 2207/30004* (2013.01);
(Continued)

(58) Field of Classification Search
CPC .... G06V 10/945; G06V 20/698; G06V 20/70; G06V 10/774; G06V 10/82; G06V 2201/03; G06T 7/0012; G06T 7/11; G06T 11/00; G06T 2200/24; G06T 2207/20081; G06T 2207/20084; G06T 2207/20104; G06T 2207/30004; G06T 2207/30168
See application file for complete search history.

(56) References Cited

U.S. PATENT DOCUMENTS 7,466,323 B2 12/2008 Krishnamurthy et al.
11,211,160 B2 12/2021 Yousfi et al.
(Continued)

FOREIGN PATENT DOCUMENTS

EP 3696820 A1 8/2020
WO 2012037419 A2 3/2012

OTHER PUBLICATIONS

PCT/US2025/028662—International Search Report—Date: Sep. 18, 2025; By: Authorized Officer Taina Matos.

*Primary Examiner* — Van D Huynh
(74) *Attorney, Agent, or Firm* — Caldwell Intellectual Property Law

(57) ABSTRACT

Systems for augmented visualization using activity windows may include at least a processor, a memory communicatively connected to the at least a processor and an interactive display device. The memory may store instructions configuring the processor to initiate a method for image processing and labeling for user display. A method for augmented visualization using activity windows may include receiving image data from an imaging device, executing at least a first algorithm on the image data, wherein the first algorithm is configured to output annotation data associated with the image data, generating a display data structure, and displaying the display data structure at interactive display device.

20 Claims, 10 Drawing Sheets

(51) Int. Cl.
| | |
|---|---|
| *G06T 11/00* | (2006.01) |
| *G06V 10/94* | (2022.01) |
| *G06V 20/69* | (2022.01) |
| *G06V 20/70* | (2022.01) |
| *G06V 10/774* | (2022.01) |
| *G06V 10/82* | (2022.01) |

(52) U.S. Cl.
CPC .. *G06T 2207/30168* (2013.01); *G06V 10/774* (2022.01); *G06V 10/82* (2022.01); *G06V 2201/03* (2022.01)

(56) References Cited

U.S. PATENT DOCUMENTS

| | | | |
|---|---|---|---|
| 2004/0042646 A1 | 3/2004 | MacAulay et al. | |
| 2011/0060766 A1* | 3/2011 | Ehlke | G16H 30/00 |
| | | | 715/810 |
| 2013/0121548 A1* | 5/2013 | Kovalan | G06T 15/08 |
| | | | 382/128 |
| 2016/0253456 A1* | 9/2016 | Goede | G06F 16/5866 |
| | | | 705/3 |
| 2017/0039322 A1* | 2/2017 | Reicher | G06F 16/583 |
| 2021/0073977 A1* | 3/2021 | Carter | G06T 11/20 |
| 2021/0279887 A1 | 9/2021 | Ma et al. | |
| 2022/0019860 A1* | 1/2022 | Weese | G16H 50/20 |
| 2022/0164493 A1 | 5/2022 | Li et al. | |
| 2022/0284666 A1* | 9/2022 | Chandler | G06T 1/60 |
| 2024/0203101 A1* | 6/2024 | Zhang | G06V 20/70 |

* cited by examiner

200

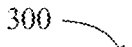
300
Activity Window
304
Primary Window
308
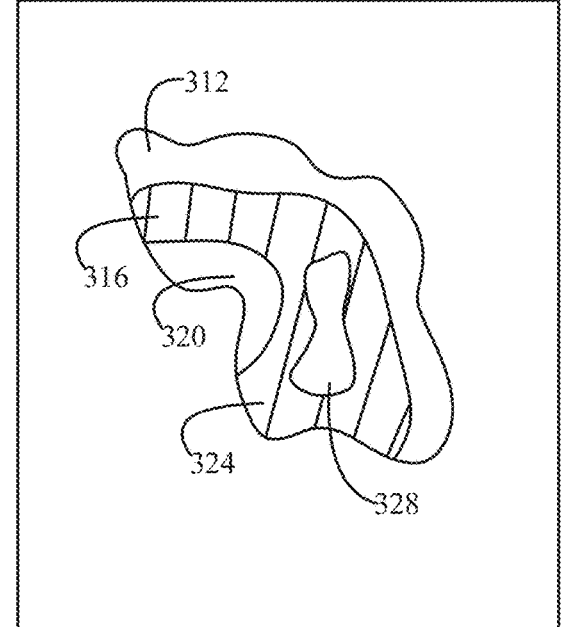
312
316
320
324
328
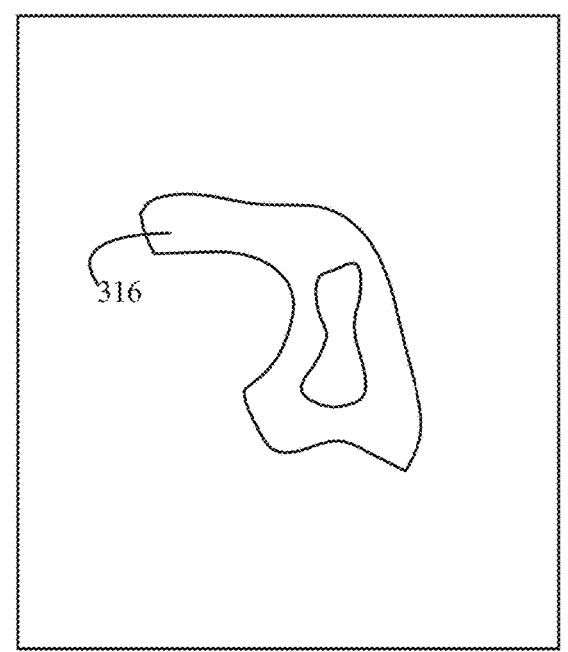
316
*FIG. 3*

Activity Window
404
Primary Window
408
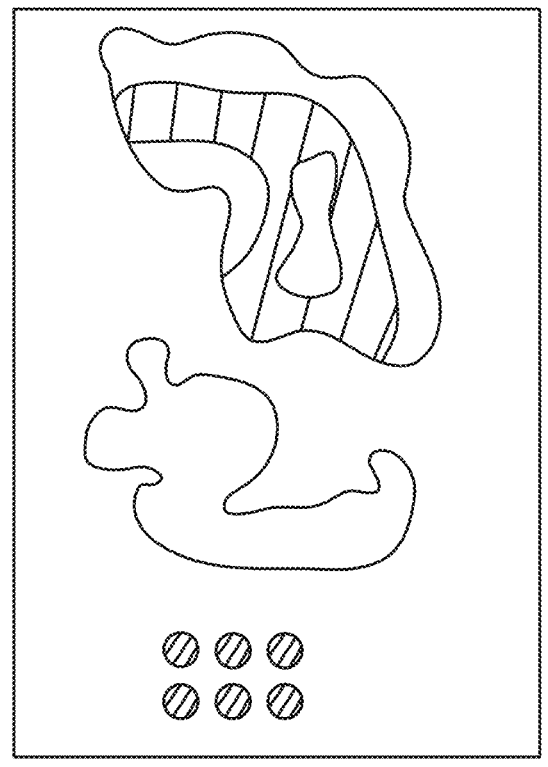
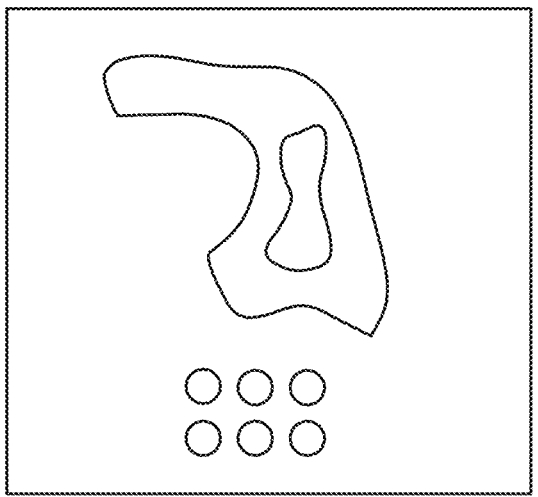
*FIG. 4*

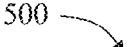
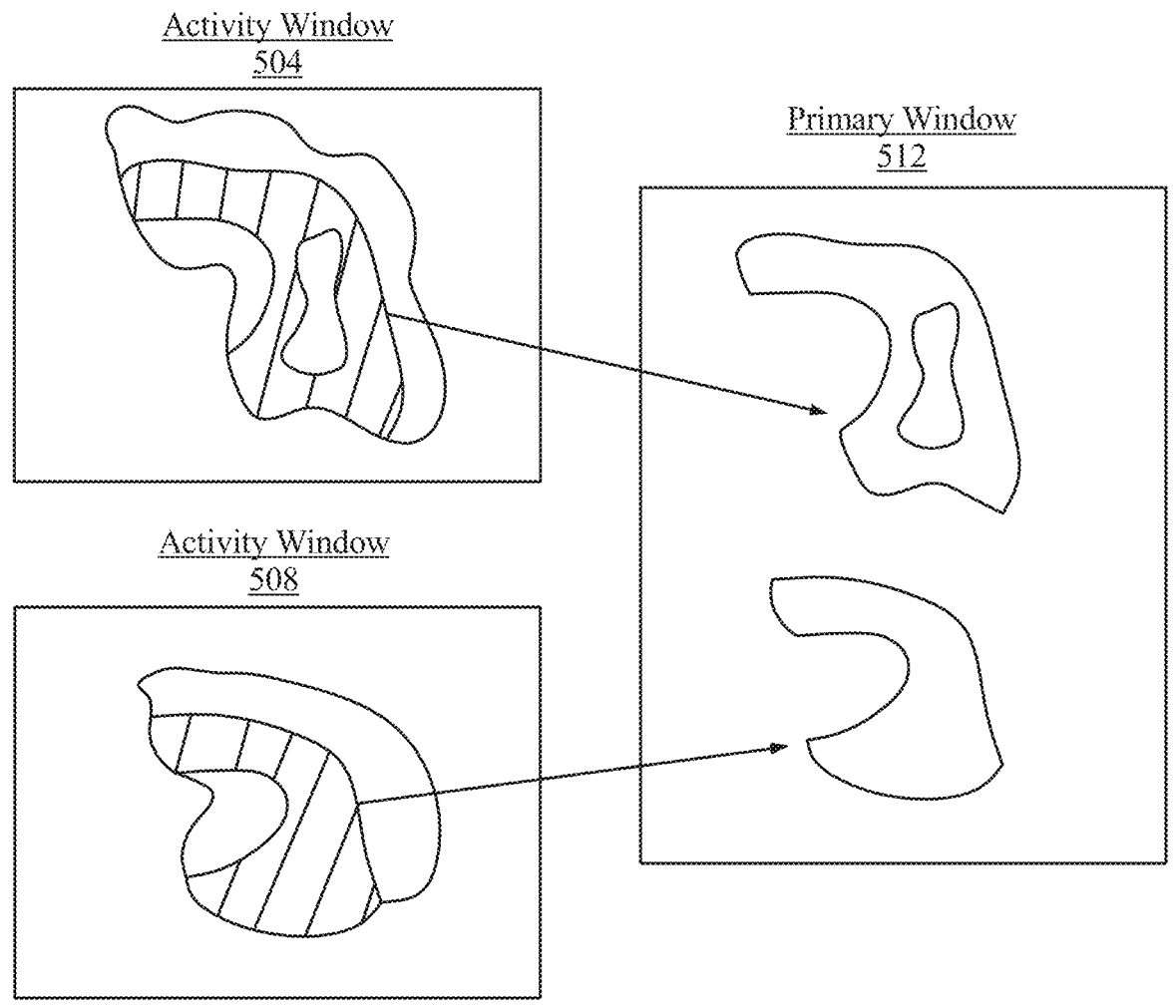
*FIG. 5*

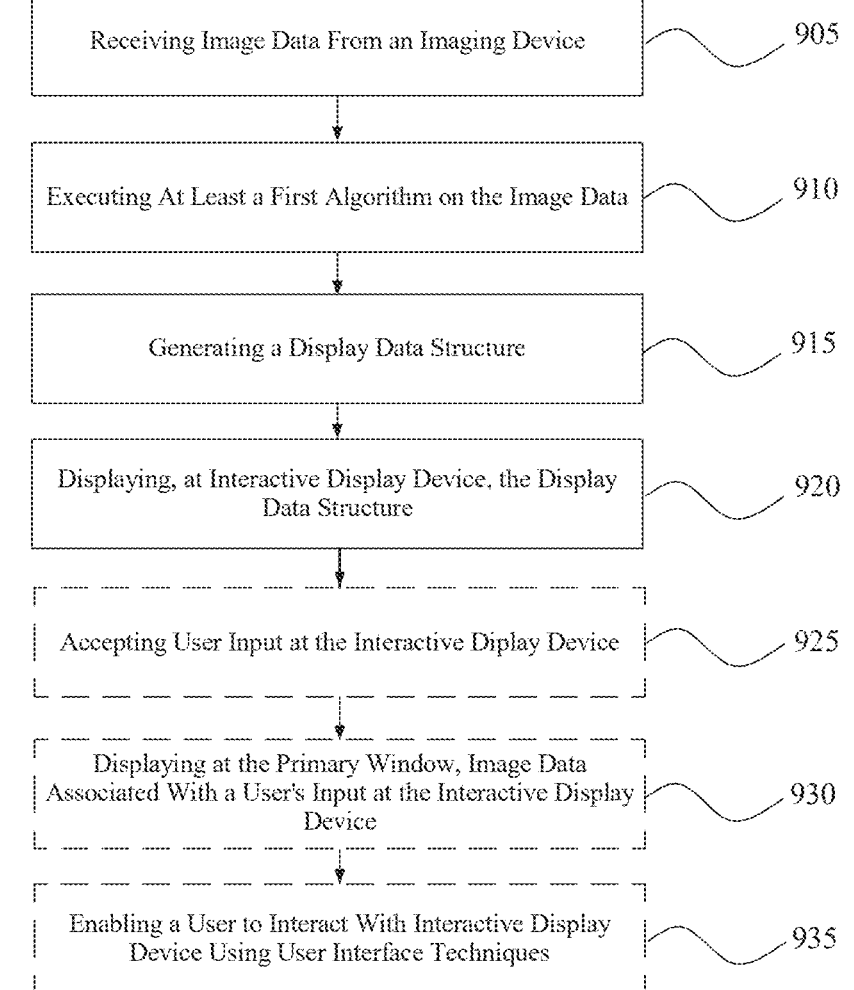

900

Receiving Image Data From an Imaging Device — 905

Executing At Least a First Algorithm on the Image Data — 910

Generating a Display Data Structure — 915

Displaying, at Interactive Display Device, the Display Data Structure — 920

Accepting User Input at the Interactive Diplay Device — 925

Displaying at the Primary Window, Image Data Associated With a User's Input at the Interactive Display Device — 930

Enabling a User to Interact With Interactive Display Device Using User Interface Techniques — 935

*FIG. 9*

SYSTEMS AND METHODS FOR AUGMENTED VISUALIZATION USING ACTIVITY WINDOWS

FIELD OF THE INVENTION

The present invention generally relates to the field of image processing. In particular, the present invention is directed to systems and methods for augmented visualization using activity windows.

BACKGROUND

Visualizing images at multiple resolutions with overlapping overlays may occlude image content. This may make the visualization process particularly difficult and cause certain content to be missed. For example, viewing biological slide images can be a challenging process. A user may be overwhelmed by the information presented on the user interface (UI) when overlays or other features are present. A UI solution is needed that allows a user to view all of the information generated by image processing algorithms without overwhelming the user or causing occlusion of certain image content.

SUMMARY OF THE DISCLOSURE

In an aspect, a system for augmented visualization using activity windows includes at least a processor, a memory communicatively connected to the at least a processor, and an interactive display device. The memory may contain instructions configuring the at least a processor to receive image data from an imaging device, execute at least a first algorithm on the image data, which is configured to output annotation data associated with image data, and generate a display data structure. The interactive display device may be configured to display to a user the generated display data structure. The display data structure may include a primary window and an activity window, wherein the activity window includes overlays, metadata, and/or the like.

In another aspect, a method for augmented visualization using activity windows includes receiving image data from an imaging device, executing at least a first algorithm on the image data, generating a display data structure, and displaying the display data structure at the interactive display device. This method and other embodiments as described below may be implemented on any embodiment of system for augmented visualization using activity windows as described throughout this disclosure.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 3 illustrates a particular implementation of a system for augmented visualization using activity windows, wherein a user may select a segment of image data to view;

FIG. 4 illustrates a particular implementation of a system for augmented visualization using activity windows, wherein selected segments from the activity window are shown;

FIG. 5 illustrates a particular implementation of a system for augmented visualization using activity windows, wherein selected segments from multiple activity windows are shown;

FIG. 9 is a flow diagram illustrating an exemplary method for image processing and labeling for user display.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for image processing and labeling for user display. In an embodiment, systems for augmented visualization using activity windows may include at least a processor, a memory communicatively connected to the at least a processor and an interactive display device. The memory may store instructions configuring the processor to initiate a method for image processing and labeling for user display. A method for augmented visualization using activity windows may include receiving image data from an imaging device, executing at least a first algorithm on the image data, wherein the first algorithm is configured to output annotation data associated with the image data, generating a display data structure, and displaying, at interactive display device, the display data structure.

Aspects of the present disclosure can be used to process and label images for user display. Aspects of the present disclosure can also be used to unclutter a user's viewing experience. This is so, at least in part, because the display data structure includes at least a primary window and an activity window. This allows a user to view image data with or without annotations or other overlays intended to aid a viewer.

Aspects of the present disclosure allow for augmented visualization using activity windows. Exemplary embodiments illustrating aspects of the present disclosure are described below in the context of several specific examples.

Figure 1:
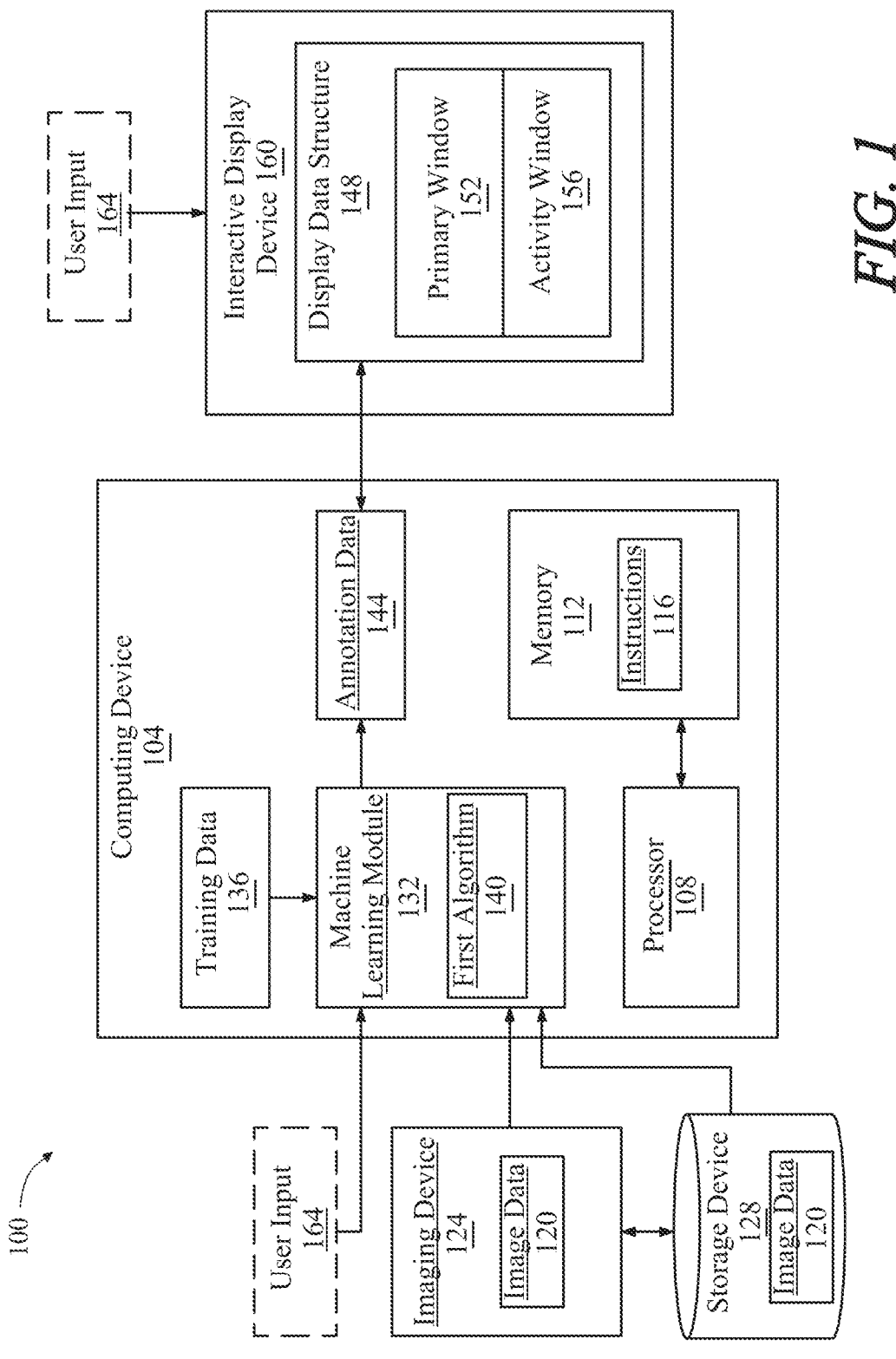
FIG. 1 is a block diagram illustrating a system for augmented visualization using activity windows.

Referring now to FIG. 1, an exemplary embodiment of system 100 for augmented visualization using activity windows is illustrated. Systems for augmented visualization using activity windows may include at least a processor 108, a memory 112 communicatively connected to the at least a processor 108 and an interactive display device 160. Memory 112 may store instructions 116 configuring processor 108 to receive image data 120 from imaging device 124, execute at least a first algorithm 140 on image data 120, and generate display data structure 148. Interactive display device 160 may be configured to display an embodiment of display data structure 148 in accordance with user input 164.

With further reference to FIG. 1, system 100 may be configured to receive image data 120 from imaging device 124. Image data 120 may include one or more image files. For example, and without limitation image data 120 may include one or more raster image files and/or one or more vector image files. This may further include image extensions such as Joint Photographic Experts Group (JPEG), Portable Network Graphics (PNG), Graphics Interchange Format (GIF), Tagged Image File (TIFF), Photoshop Document (PSD), Portable Document Format (PDF), Encapsulated Postscript (EPS), Adobe Illustrator Document (AI), Adobe InDesign Document (INDD), and/or Raw Image Formats (RAW). As a nonlimiting example, image data 120 may include one or more scans of one or more tissue slides. As used throughout this disclosure, "tissue slides," refers to a slide that exhibits a biological specimen for viewing. A tissue slide may include a plurality of different cell types, a single cell type, and/or the like. Image data 120 may be received from imaging device 124 directly and/or from storage device 128 where image data 120 may be stored. Imaging device 124 may additionally be communicatively connected to storage device 128. Imaging device 124 is any device that is designed and/or configured to capture a digitized visual of a real-life element. Imaging device 124 may include an optical scanner, x-rays, computed tomography (CT) scanners, ultrasonography, mammography, positron-emission tomography (PET), and/or the like. In some embodiments, imaging device 124 may include a table on which a tissue slide may be mounted. Further, in some embodiments the table may be moveable in the X, Y, Z directions.

Continuing to reference FIG. 1, in some embodiments, imaging device 124 additionally include at least a camera. As used in this disclosure, a "camera" is a device that is configured to sense electromagnetic radiation, such as without limitation visible light, and generate an image representing the electromagnetic radiation. In some cases, a camera may include one or more optics. Exemplary non-limiting optics include spherical lenses, aspherical lenses, reflectors, polarizers, filters, windows, aperture stops, and the like. In some cases, at least a camera may include an image sensor. Exemplary non-limiting image sensors include digital image sensors, such as without limitation charge-coupled device (CCD) sensors and complimentary metal-oxide-semiconductor (CMOS) sensors, chemical image sensors, and analog image sensors, such as without limitation film. In some cases, a camera may be sensitive within a non-visible range of electromagnetic radiation, such as without limitation infrared. As used in this disclosure, "image data" is information representing at least a physical scene, space, and/or object. In some cases, image data 120 may be generated by a camera. "Image data" may be used interchangeably through this disclosure with "image," where image is used as a noun. An image may be optical, such as without limitation where at least an optic is used to generate an image of an object. An image may be material, such as without limitation when film is used to capture an image. An image may be digital, such as without limitation when represented as a bitmap. Alternatively, an image may be comprised of any media capable of representing a physical scene, space, and/or object.

Still referring to FIG. 1, in some embodiments, system 100 may include a machine vision system that includes at least a camera. A machine vision system may use images from at least a camera, to make a determination about a scene, space, and/or object. For example, in some cases a machine vision system may be used for world modeling or registration of objects within a space. In some cases, registration may include image processing, such as without limitation object recognition, feature detection, edge/corner detection, and/or the like. Non-limiting example of feature detection may include scale invariant feature transform (SIFT), Canny edge detection, Shi Tomasi corner detection, and/or the like. In some cases, registration may include one or more transformations to orient a camera frame (or an image or video stream) relative a three-dimensional coordinate system; exemplary transformations include without limitation homography transforms and affine transforms. In an embodiment, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however. A third dimension of registration, representing depth and/or a z axis, may be detected by comparison of two frames; for instance, where first frame includes a pair of frames captured using a pair of cameras (e.g., stereoscopic camera also referred to in this disclosure as stereo-camera), image recognition and/or edge detection software may be used to detect a pair of stereoscopic views of images of an object; two stereoscopic views may be compared to derive z-axis values of points on object permitting, for instance, derivation of further z-axis points within and/or around the object using interpolation. This may be repeated with multiple objects in field of view, including without limitation environmental features of interest identified by object classifier and/or indicated by an operator. In an embodiment, x and y axes may be chosen to span a plane common to two cameras used for stereoscopic image capturing and/or an xy plane of a first frame; a result, x and y translational components and ø may be pre-populated in translational and rotational matrices, for affine transformation of coordinates of object, also as described above. Initial x and y coordinates and/or guesses at transformational matrices May alternatively or additionally be performed between first frame and second frame, as described above. For each point of a plurality of points on object and/or edge and/or edges of object as described above, x and y coordinates of a first stereoscopic frame may be populated, with an initial estimate of z coordinates based, for instance, on assumptions about object, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level. In some cases, a machine vision system may use a classifier, such as any classifier described throughout this disclosure. The process of digitizing one or more captured image data 120 may be accomplished, without limitation, as disclosed in U.S. application Ser. No. 18/428,823, filed on Jan. 31, 2024 and entitled "SYSTEMS AND METHODS FOR VISUALIZATION OF DIGITIZED SLIDES" the entirety of which is incorporated herein by reference.

With continued reference to FIG. 1, system 100 may be configured to execute at least a first algorithm 140 on image data 120. In an embodiment, machine learning module 132 may be configured to execute one or more of the algorithms discussed below. Training of machine learning module 132 may take place at computing device 104 and/or remotely. Exemplary training data 136 may vary depending on the algorithm. Retraining of machine learning module 132 may take place at computing device 104 and/or remotely. Additionally, outputs of machine learning module 132 may reiteratively be used as new training data 136. At least a first algorithm 140 may be configured to output annotation data 144 associated with image data 120. In an embodiment, at least a first algorithm 140 may include one or more of the following algorithms: an algorithm configured to calculate a fitness measure of the image data 120 and flag the image data 120 accordingly, an algorithm configured to determine a quality metric from the image data 120, an algorithm configured to identify different cell groups in one or more image data 120, and/or an algorithm configured to generate a color gamut correction for one or more image data 120. At least a first algorithm 140 may include any algorithm as described specifically herein and/or any other algorithm constructed to aid in image processing and has an influence on a viewer's display of an image. Implementation of one or more of at least a first algorithm 140 may be assisted by a machine vision system as described above and/or any other imaging device as described throughout this disclosure.

With continued reference to FIG. 1, in an embodiment, and without limitation, machine learning module 132 may comprise a deep neural network (DNN). As used in this disclosure, a "deep neural network" is defined as a neural network with two or more hidden layers. Neural network is described in further detail below with reference to FIGS. 7-8. In a non-limiting example, machine learning module 132 may include a convolutional neural network (CNN). Generating exemplary outputs may include training CNN using the exemplary, nonlimiting training data listed for each individual algorithm. A "convolutional neural network," for the purpose of this disclosure, is a neural network in which at least one hidden layer is a convolutional layer that convolves inputs to that layer with a subset of inputs known as a "kernel," along with one or more additional layers such as pooling layers, fully connected layers, and the like. In some cases, CNN may include, without limitation, a deep neural network (DNN) extension. Mathematical (or convolution) operations performed in the convolutional layer may include convolution of two or more functions, where the kernel may be applied to input data e.g., any of the exemplary training data as described throughout this disclosure through a sliding window approach. In some cases, convolution operations may enable processor 108 to detect local/global patterns, edges, textures, and any other features described herein within. Spatial features may be passed through one or more activation functions, such as without limitation, Rectified Linear Unit (ReLU), to introduce non-linearities into the processing step of generating exemplary outputs. Additionally, or alternatively, CNN may also include one or more pooling layers, wherein each pooling layer is configured to reduce the dimensionality of input data while preserving essential features within the input data. In a non-limiting example, CNN may include one or more pooling layer configured to reduce the dimensions of spatial feature maps by applying downsampling, such as max-pooling or average pooling, to small, non-overlapping regions of one or more features.

Still referring to FIG. 1, CNN may further include one or more fully connected layers configured to combine features extracted by the convolutional and pooling layers as described above. In some cases, one or more fully connected layers may allow for higher-level pattern recognition. In a non-limiting example, one or more fully connected layers may connect every neuron (i.e., node) in its input to every neuron in its output, functioning as a traditional feedforward neural network layer. In some cases, one or more fully connected layers may be used at the end of CNN to perform high-level reasoning and produce the final output such as, without limitation, the exemplary outputs as described below in the context of each specific example. Further, each fully connected layer may be followed by one or more dropout layers configured to prevent overfitting, and one or more normalization layers to stabilize the learning process described herein.

With continued reference to FIG. 1, in an embodiment, and without limitation a feature learning algorithm may be utilized to group divided image data 120 into categories. The grouped image data 120 may then be run through an image classifier, such as without limitation, a CNN. In some embodiments the CNN may label each section as a section to be displayed within data display structure 148 at interactive display device 160 and/or alternatively be used to create a more uniform grouping of categories. For example, and without limitation this may be used in color correction as described in further detail below. Additionally, this classification may be used to assist in any labeling process as described below in the context of an embodiment of at least a first algorithm 140. A "feature learning algorithm," as used herein, is a machine-learning algorithm that identifies associations between elements of data in a data set, which may include without limitation a training data set, where particular outputs and/or inputs are not specified. For instance, and without limitation, a feature learning algorithm may detect co-occurrences of elements of data, as defined above, with each other. As a non-limiting example, feature learning algorithm may detect co-occurrences of elements, as defined above, with each other. Computing device may perform a feature learning algorithm by dividing elements or sets of data into various sub-combinations of such data to create new elements of data and evaluate which elements of data tend to co-occur with which other elements. In an embodiment, first feature learning algorithm may perform clustering of data. Clustering of data may be categorized based on the algorithm being implemented. For example, and without limitation, clusters may be categorized based on cell type, which may require a comparison of labeled data of specific cell types and unlabeled data of specific cell types.

Continuing refer to FIG. 1, a feature learning and/or clustering algorithm may be implemented, as a non-limiting example, using a k-means clustering algorithm. A "k-means clustering algorithm" as used in this disclosure, includes cluster analysis that partitions n observations or unclassified cluster data entries into k clusters in which each observation or unclassified cluster data entry belongs to the cluster with the nearest mean. "Cluster analysis" as used in this disclosure, includes grouping a set of observations or data entries in way that observations or data entries in the same group or cluster are more similar to each other than to those in other groups or clusters. Cluster analysis may be performed by various cluster models that include connectivity models such as hierarchical clustering, centroid models such as k-means, distribution models such as multivariate normal distribution, density models such as density-based spatial clustering of applications with nose (DBSCAN) and ordering points to identify the clustering structure (OPTICS), subspace models such as biclustering, group models, graph-based models such as a clique, signed graph models, neural models, and the like. Cluster analysis may include hard clustering whereby each observation or unclassified cluster data entry belongs to a cluster or not. Cluster analysis may include soft clustering or fuzzy clustering whereby each observation or unclassified cluster data entry belongs to each cluster to a certain degree such as for example a likelihood of belonging to a cluster; for instance, and without limitation, a fuzzy clustering algorithm may be used to identify clustering of elements of a first type or category with elements of a second type or category, and vice versa. Cluster analysis may include strict partitioning clustering whereby each observation or unclassified cluster data entry belongs to exactly one cluster. Cluster analysis may include strict partitioning clustering with outliers whereby observations or unclassified cluster data entries may belong to no cluster and may be considered outliers. Cluster analysis may include overlapping clustering whereby observations or unclassified cluster data entries may belong to more than one cluster. Cluster analysis may include hierarchical clustering whereby observations or unclassified cluster data entries that belong to a child cluster also belong to a parent cluster.

With continued reference to FIG. 1, computing device may generate a k-means clustering algorithm receiving unclassified data and outputs a definite number of classified data entry clusters wherein the data entry clusters each contain cluster data entries. K-means algorithm may select a specific number of groups or clusters to output, identified by a variable "k." Generating a k-means clustering algorithm includes assigning inputs containing unclassified data to a "k-group" or "k-cluster" based on feature similarity. Centroids of k-groups or k-clusters may be utilized to generate classified data entry cluster. K-means clustering algorithm may select and/or be provided "k" variable by calculating k-means clustering algorithm for a range of k values and comparing results. K-means clustering algorithm may compare results across different values of k as the mean distance between cluster data entries and cluster centroid. K-means clustering algorithm may calculate mean distance to a centroid as a function of k value, and the location of where the rate of decrease starts to sharply shift, this may be utilized to select a k value. Centroids of k-groups or k-cluster include a collection of feature values which are utilized to classify data entry clusters containing cluster data entries. K-means clustering algorithm may act to identify clusters of closely related data, which may be provided with user cohort labels; this may, for instance, generate an initial set of user cohort labels from an initial set of data, and may also, upon subsequent iterations, identify new clusters to be provided new labels, to which additional data may be classified, or to which previously used data may be reclassified.

With continued reference to FIG. 1, generating a k-means clustering algorithm may include generating initial estimates for k centroids which may be randomly generated or randomly selected from unclassified data input. K centroids may be utilized to define one or more clusters. K-means clustering algorithm may assign unclassified data to one or more k-centroids based on the squared Euclidean distance by first performing a data assigned step of unclassified data. K-means clustering algorithm may assign unclassified data to its nearest centroid based on the collection of centroids ci of centroids in set C. Unclassified data may be assigned to a cluster based on $argmin_{c_i \ni c}$ dist $(c_i, x)^2$, where argmin includes argument of the minimum, $c_i$ includes a collection of centroids in a set C, and dist includes standard Euclidean distance. K-means clustering module may then recompute centroids by taking mean of all cluster data entries assigned to a centroid's cluster. This may be calculated based on $c_i=1/|S_i|\Sigma x_i \ni S_i^{x_i}$. K-means clustering algorithm may continue to repeat these calculations until a stopping criterion has been satisfied such as when cluster data entries do not change clusters, the sum of the distances have been minimized, and/or some maximum number of iterations has been reached.

Still referring to FIG. 1, k-means clustering algorithm may be configured to calculate a degree of similarity index value. A "degree of similarity index value" as used in this disclosure, includes a distance measurement indicating a measurement between each data entry cluster generated by k-means clustering algorithm and a selected element. Degree of similarity index value may indicate how close a particular combination of elements is to being classified by k-means algorithm to a particular cluster. K-means clustering algorithm may evaluate the distances of the combination of elements to the k-number of clusters output by k-means clustering algorithm. Short distances between an element of data and a cluster may indicate a higher degree of similarity between the element of data and a particular cluster. Longer distances between an element and a cluster may indicate a lower degree of similarity between a elements to be compared and/or clustered and a particular cluster.

With continued reference to FIG. 1, k-means clustering algorithm selects a classified data entry cluster as a function of the degree of similarity index value. In an embodiment, k-means clustering algorithm may select a classified data entry cluster with the smallest degree of similarity index value indicating a high degree of similarity between an element and the data entry cluster. Alternatively or additionally k-means clustering algorithm may select a plurality of clusters having low degree of similarity index values to elements to be compared and/or clustered thereto, indicative of greater degrees of similarity. Degree of similarity index values may be compared to a threshold number indicating a minimal degree of relatedness suitable for inclusion of a set of element data in a cluster, where degree of similarity indices a-n falling under the threshold number may be included as indicative of high degrees of relatedness. The above-described illustration of feature learning using k-means clustering is included for illustrative purposes only and should not be construed as limiting potential implementation of feature learning algorithms; persons skilled in the art, upon reviewing the entirety of this disclosure, will be aware of various additional or alternative feature learning approaches that may be used consistently with this disclosure.

Further referencing FIG. 1, at least a first algorithm 140 may include an algorithm configured to calculate a fitness measure of the image data 120 and flag the image data 120 accordingly. As used throughout this disclosure, "fitness measure" is a benchmark for meeting certain standards and/or criteria. In an embodiment an algorithm configured to calculate a fitness measure of the image data 120 and flag the image data 120 accordingly may work in tandem with an algorithm configured to determine a quality metric from the image data 120. An algorithm configured to calculate a fitness measure of the image data 120 and flag the image data 120 accordingly may be implemented, without limitation, as disclosed in U.S. application Ser. No. 18/226,017, filed on Jul. 25, 2023 and entitled "APPARATUS AND A METHOD FOR GENERATING A CONFIDENCE SCORE ASSOCIATED WITH A SCANNED LABEL" the entirety of which is incorporated herein by reference. When image data 120 is flagged, imaging device 124 may capture additional image data 120 and perform one or more of the algorithms described throughout this disclosure on the newly captured image data 120. This may include replacing the flagged image data 120 and/or integrating the image data 120 in accordance with one or more of the described methods in relation to at least a first algorithm 140.

Continuing to reference FIG. 1, an algorithm configured to calculate a fitness measure of the image data 120 and flag the image data 120 accordingly may include training data 136 specific to such an embodiment of at least a first algorithm 140. Exemplary training data 136 may include, without limitation, inputs such as image data 120, flagged image data 120, fitness measurements, fitness measurement parameters, image data 120 parameters, rule-based actions correlated to fitness measurement parameters and image data 120 parameters, and/or the like correlated to outputs such as flagged image data 120, new image data 120 parameters, fitness measurements, and/or the like.

With further reference to FIG. 1, at least a first algorithm 140 may include an algorithm configured to determine a quality metric from the image data 120. An algorithm configured to determine a quality metric from the image data 120 may be implemented, without limitation, as disclosed in U.S. application Ser. No. 18/602,947, filed on Mar. 12, 2024 and entitled "SYSTEMS AND METHODS FOR INLINE QUALITY CONTROL OF SLIDE DIGITIZATION" the entirety of which is incorporated herein by reference. Additionally, an algorithm configured to determine a quality metric from image data 120 may implement blur detection and/or focus detection. Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity, and a low score indicates blurriness. Blur detection may be performed using a Gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability to coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content. The quality of focus may be determined by analyzing a degree of focus at a portion of an image containing image data 120 of interest; this may be accomplished using any algorithm and/or operator as described above for blurriness detection and/or determination of degree of focus. Alternatively or additionally, a whole-image blurriness detection process with regard to a section of image containing image data 120 of interest. Quality level may be determined according to a degree of lightness, darkness, contrast, and/or another parameter. Machine learning module 132 may also analyze a series of image data 120 taken in rapid succession of the same subject matter, but at varying camera lens focal lengths, exposure times, and/or the like. In this case the machine learning module 132 may identify the most in-focus image corresponding to a selected region of the image. This may be implemented, without limitation, as disclosed in U.S. application Ser. No. 18/227,155, filed on Jul. 27, 2023 and entitled "METHOD OF AND SYSTEM FOR INLINE HEALTHCARE IMAGE ENRICHMENT" the entirety of which is incorporated herein by reference. Further, an algorithm configured to determine a quality metric from image data 120 may additionally implement a process to correct image data 120 using other captured image data 120 of related matter. This may be implemented, without limitation, as disclosed in U.S. application Ser. No. 18/603,051, filed on Mar. 12, 2024 and entitled "SYSTEMS AND METHODS FOR DIGITIZATION OF TISSUE SLIDES BASED ON ASSOCIATIONS AMONG SERIAL SECTIONS" the entirety of which is incorporated herein by reference. In some embodiments, this algorithm may additionally generate scanning parameters to be used to recapture image data 120 in accordance with the quality level.

Continuing to reference FIG. 1, at least a first algorithm 140 may include an algorithm configured to identify different cell groups in one or more image data 120. This may be implemented, without limitation, as disclosed in U.S. application Ser. No. 18/602,776, filed on Mar. 12, 2024 and entitled "SYSTEMS AND METHODS FOR DETECTION OF PATHOLOGICAL FEATURES DURING SLIDE DIGITIZATION" the entirety of which is incorporated herein by reference. Additionally, in an embodiment, the algorithm may utilize machine or computer vision configured to identify different cell groups. An algorithm configured to identify different cell groups in one or more image data 120 may utilize image classification and/or object detection techniques. For example, and without limitation, in an embodiment, a first algorithm that includes an algorithm configured to identify different cell groups may utilize edge detection, resizing, decimation, interpolation, and/or the like. In some embodiments, specific implementations of an algorithm configured to identify different cell groups may include dividing an image into pieces using one or more of the following: edge detection, average chroma and/or luma value, a grid of rectangles and/or other polygons or even curved shapes. Further, in some embodiments, these divisions may then be run through a classifier using particle swarm optimization, k-means clustering, and/or other clustering and/or unsupervised machine learning process to group pixels into categories. Categories may include chroma and luma. Further clustering may be based on labeled image data 120, for example, and without limitation clusters may be created based on categorization of cell types. Alternatively, the divisions may be input into a neural network that is trained to find the regions of interest in an image. In some embodiments, neural network may include a nuclei detection neural network. Nuclei detection neural networks may include, as non-limiting examples, DenseUNet, UNet, Mask R-CNN neural networks, and the like. In some embodiments, neural network may include one or more tumor localization models which may be configured to locate tumors. In some embodiments, neural networks may include a neural network configured to detect mitotic nuclei. An algorithm configured to identify different cell groups may utilize image classification techniques that include supervised and/or unsupervised processes. Further an algorithm configured to identify different cell groups may instantiate machine learning module 132 to identify different cell groups. Machine learning module 132 may include a machine learning model and/or a neural network. In an embodiment, machine learning module 132 may be, or include a convolutional neural network. Exemplary training data 136 may include, without limitation, inputs such as image data 120 containing one or more cell groups, image data 120 containing one or more cell groups and additional background noise, such as bubbles, extra stain, and/or the like, labeled or classified image data 120 containing one cell group, labeled or classified image data 120 containing more than one cell group, and/or the like and correlated to outputs such as image data 120 identifying different cell groups, labeled or classified image data 120 containing one cell group, labeled or classified image data 120 containing more than one cell group. Outputs of machine learning module 132 may be used reiteratively as new training data 136. Training of machine learning module 132 may take place at computing device 104 and/or remotely. Likewise, retraining of machine learning module 132 may take place at computing device 104 and/or remotely.

With continued reference to FIG. 1, at least a first algorithm 140 may include an algorithm configured to generate a color gamut correction for one or more image data 120. An algorithm configured to generate a color gamut correction for one or more image data 120 may be implemented, without limitation, as disclosed in U.S. application Ser. No. 18/513,079, filed on Nov. 22, 2023 and entitled "SYSTEM AND METHOD FOR COLOR GAMUT NORMALIZATION FOR PATHOLOGY SLIDES" the entirety of which is incorporated herein by reference.

Further referencing FIG. 1, system 100 may be configured to generate display data structure 148. Display data structure 148 may include at least a primary window 152 and an activity window 156. In some embodiments, display data structure 148 may include primary window 152 and one or more activity windows 156. For example, and without limitation see FIG. 5 for a particular implementation of this embodiment. Further, in some embodiments display data structure 148 may include one or more primary windows 152 and/or one or more activity windows 156. The embodiment of display data structure 148 may depend on a user's inputs and/or preferences. As used throughout this disclosure, "primary window" is the visualization of image data 120 without overlay of metadata. Metadata may include metadata that is descriptive, administrative, and/or structural. For example, and without limitation, metadata may include annotation data 144. Annotation data 144 may include notes, dates, titles, file sizes, mask overlays, and/or the like. As used throughout this disclosure, "activity window" is the visualization of image data 120 with overlay of metadata. In some embodiments, activity window 156 may further include one or more adaptive overlays with metadata at varying levels of magnification. Adaptive overlays may include transparent masks with overlay information, contours with overlay information, dots of various sizes with information, and/or the like. Adaptive overlays may be at varying magnification levels, such as high magnification, intermediate magnification, and/or lower magnification. In some embodiments, display data structure 148 may display primary window 152 and activity window 156 in a side-by-side manner. Wherein primary window 152 and activity window 156 are both shown at interactive display device 160. Further, in some embodiments, display data structure 148 may include adjacent image data 120 to primary window 152 and activity window 156 including altered image data 120. "Altered image data," as used herein, refers to image data 120 that includes an additional and or different limitation in comparison to the original image data 120. For example, and without limitation, in some embodiments, where image data 120 includes one or more scanned tissue slides, the altered image data 120 may include one or more tissue slides with a different and/or no stain.

With continued reference to FIG. 1, in some embodiments, system 100 may further be configured to accept user input 164 at interactive display device 160. User input 164 may include selecting an area of interest of image data 120, zooming in and/or out, panning across image data 120, highlighting, typing, clicking, and/or the like. For example, and without limitation, in some embodiments, system 100 may be further configured to accept user input 164, selecting a region of interest of image data 120, display at primary window 152, the selected region of interest of image data 120, and enable the user, at interactive display device 160, to zoom, pan, or otherwise interact with the region of interest of image data 120. In some embodiments, user input 164 may include the use of image segmentation tools. For example, in some embodiments, system 100 may be further configured to accept user input 164 of multiple segments of interest from display data structure 148, composite a virtual composite image from the selected segments of interest, and display the virtual composite image at primary window 152. In some embodiments, a user may toggle between metadata displayed on activity window 156 at interactive display device 160. This may enable a user to choose particular metadata displayed at primary window 152.

With further reference to FIG. 1, interactive display device 160 may be configured to display to a user the generated display data structure 148 generated at computing device 104. In some embodiments this may be accomplished via a graphical user interface (GUI) configured to display data structure 148 at interactive display device 160. Interactive display device 160 may be communicatively connected to computing device. User input 164 may update display data structure 148. For example, and without limitation, updates to primary window 152 may occur based on interaction with activity window 156 and its associated metadata. In some embodiments, this may be accomplished using event handlers. Interactive display device 160 may be any display device as described throughout this disclosure.

Still referring to FIG. 1, in some embodiments, computing device 104 may be configured to configure interactive display device 160 to display an event handler graphic corresponding to a data-reception event handler. As used in this disclosure, an "event handler graphic" is a graphical element with which a user of remote device may interact to enter data, for instance and without limitation for a search query or the like as described in further detail below. An event handler graphic may include, without limitation, a button, a link, a checkbox, a text entry box and/or window, a drop-down list, a slider, or any other event handler graphic that may occur to a person skilled in the art upon reviewing the entirety of this disclosure. An "event handler," as used in this disclosure, is a module, data structure, function, and/or routine that performs an action on remote device in response to a user interaction with event handler graphic. For instance, and without limitation, an event handler may record data corresponding to user selections of previously populated fields such as drop-down lists and/or text auto-complete and/or default entries, data corresponding to user selections of checkboxes, radio buttons, or the like, potentially along with automatically entered data triggered by such selections, user entry of textual data using a keyboard, touchscreen, speech-to-text program, or the like. Event handler may generate prompts for further information, may compare data to validation rules such as requirements that the data in question be entered within certain numerical ranges, and/or may modify data and/or generate warnings to a user in response to such requirements. An event handler may convert data into expected and/or desired formats, for instance such as date formats, currency entry formats, name formats, or the like. Event handler may transmit data from remote device to computing device 104.

In an embodiment, and continuing to refer to FIG. 1, event handler may include a cross-session state variable. As used herein, a "cross-session state variable" is a variable recording data entered on remote device during a previous session. Such data may include, for instance, previously entered text, previous selections of one or more elements as described above, or the like. For instance, cross-session state variable data may represent a search a user entered in a past session. Cross-session state variable may be saved using any suitable combination of client-side data storage on remote device and server-side data storage on computing device 104; for instance, data may be saved wholly or in part as a "cookie" which may include data or an identification of remote device to prompt provision of cross-session state variable by computing device 104, which may store the data on computing device 104. Alternatively, or additionally, computing device 104 may use login credentials, device identifier, and/or device fingerprint data to retrieve cross-session state variable, which computing device 104 may transmit to remote device. Cross-session state variable may include at least a prior session datum. A "prior session datum" may include any element of data that may be stored in a cross-session state variable. An event handler graphic may be further configured to display the at least a prior session datum, for instance and without limitation auto-populating user query data from previous sessions.

With continued reference to FIG. 1, system 100 may include a computing device. Computing device 104 includes a processor communicatively connected to a memory. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Further referring to FIG. 1, Computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented, as a non-limiting example, using a "shared nothing" architecture.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 2:
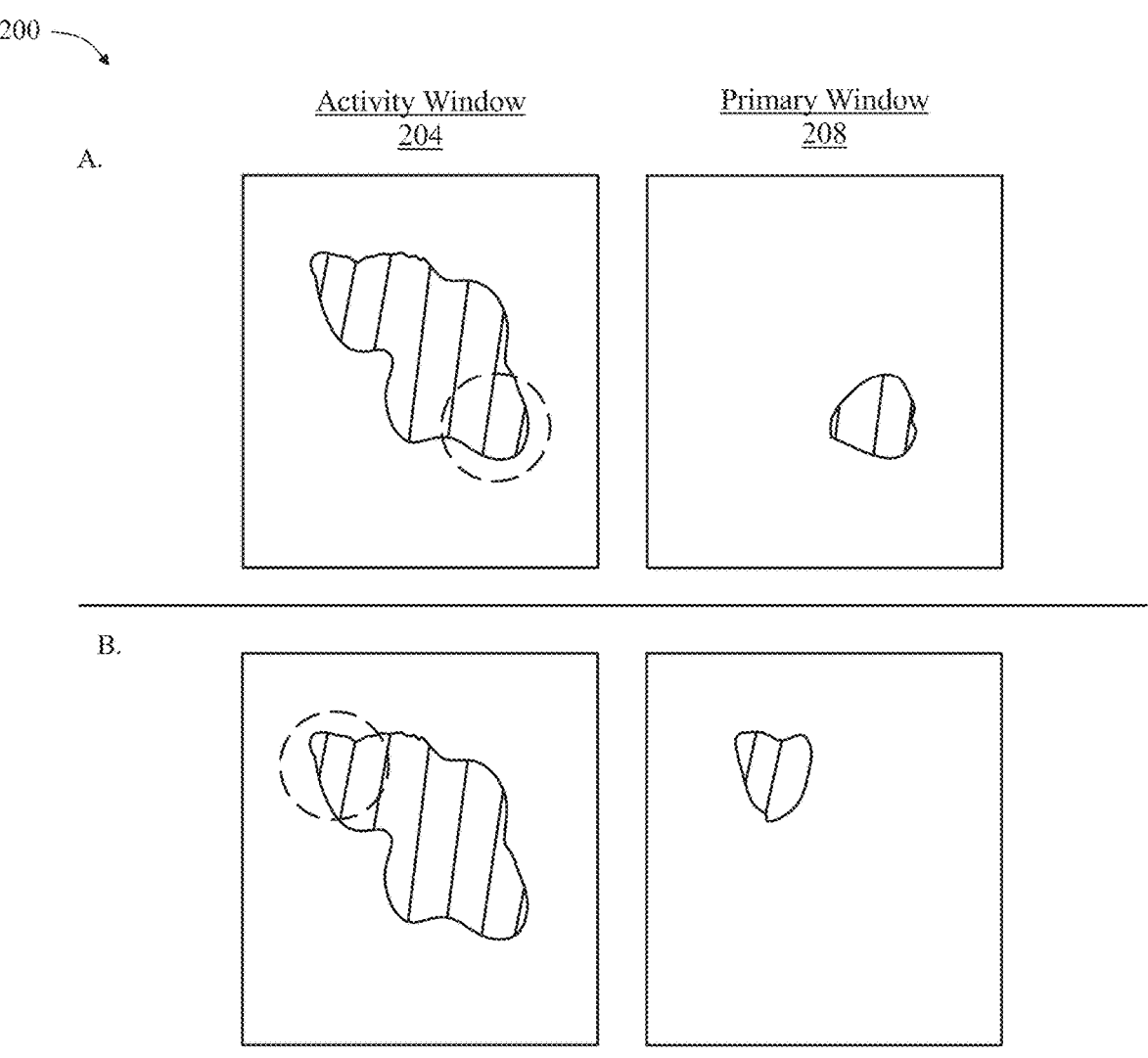
FIG. 2 illustrates a particular implementation of a system for augmented visualization using activity windows, wherein a user may highlight a portion of the image data.

Now referring to FIG. 2, illustrated is a particular implementation of a system for augmented visualization using activity windows, wherein a user may highlight a portion of the image data. In an embodiment, a user may highlight a certain portion of the image data within activity window 204. The highlighted portion of image data, or the highlighted subset of the image data is displayed in primary window 208. The subset image data displayed in primary window 208 may be zoomed in and out based on the resolution levels available to the image data. Panel set A, illustrates the bottom right portion of the image data being highlighted in activity window 204. The corresponding subset image is displayed in primary window 208. Likewise, panel set B illustrates the top left portion of image data being highlighted in activity window 204. The corresponding subset image data is displayed in primary window 208.

Now referring to FIG. 3, illustrated is a particular implementation of a system for augmented visualization using activity windows, wherein a user may select a segment of image data to view. Selection of a segment from activity window 304 will display only the image data contents of that segment in primary window 308. Illustrated in activity window 304, is image data being segmented into five parts: 312, 316, 320, 324, and 328. Part 316 was selected by the user in activity window 304. Therefore, only part 316 is displayed in primary window 308. Pan, zoom, and/or other user interface options are available for part 116 in primary window 308.

Now referring to FIG. 4, illustrated is a particular implementation of a system for augmented visualization using activity windows, wherein selected segments from the activity window are shown. A user may select segments from image data from different locations of the image data, as shown in FIG. 4. The segments may be spatially reorganized as a virtual slide in primary window 408 in a compact representation of segments for ease of analysis.

Now referring to FIG. 5, illustrated is a particular implementation of a system for augmented visualization using activity windows, wherein selected segments from multiple activity windows are shown. In some embodiments a user may select segments of image data from one or more activity windows, such as activity window 504 and activity window 508, having one or more image data present. The segments may be spatially reorganized as a virtual slide in primary window 512 in a compact representation of segments of interest for ease of analysis. Pan, zoom, and/or other user interface options as discussed throughout this disclosure are available for the selected segments displayed in primary window 512.

Figure 6:
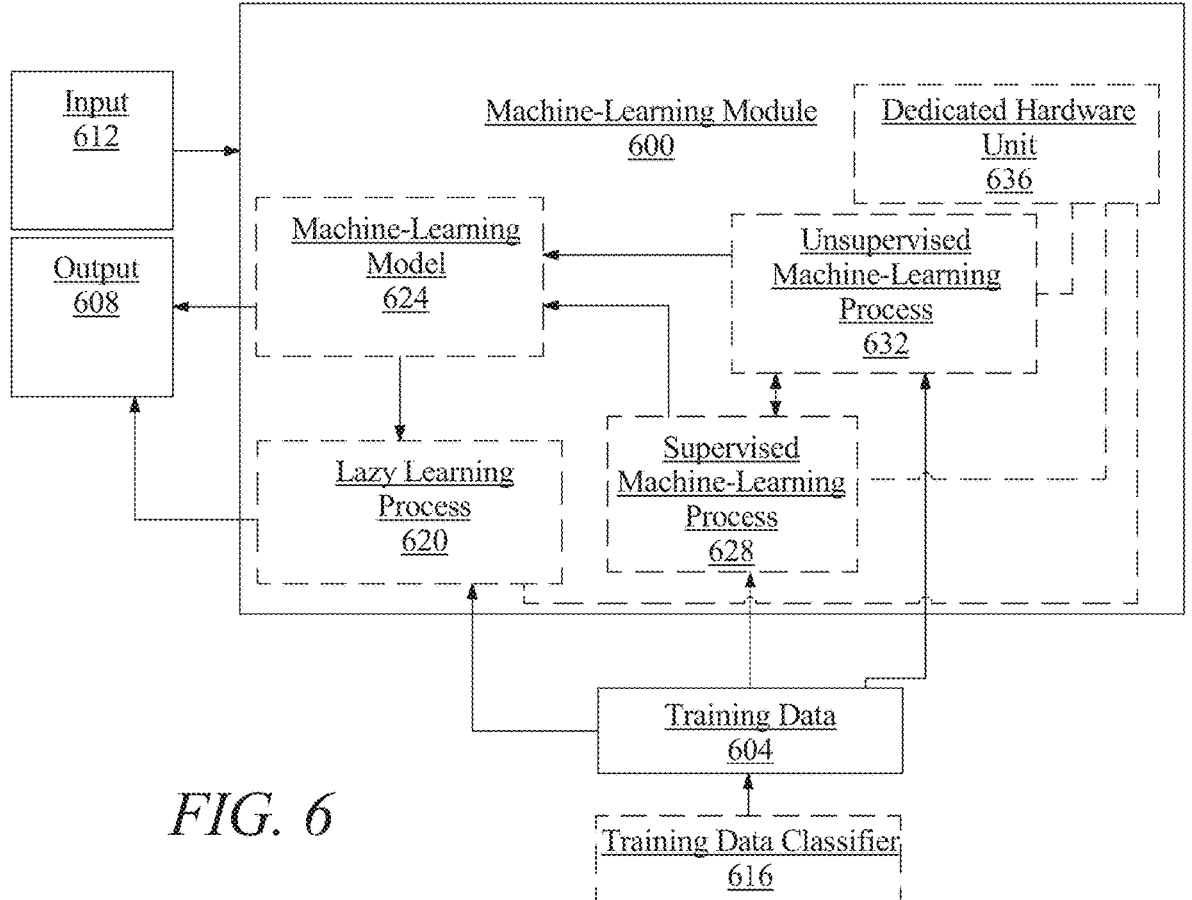
FIG. 6 illustrates an exemplary machine-learning module.

Referring now to FIG. 6, an exemplary embodiment of a machine-learning module 600 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 604 to generate an algorithm instantiated in hardware or software logic, data structures, and/or functions that will be performed by a computing device/module to produce outputs 608 given data provided as inputs 612; this is in contrast to a non-machine learning software program where the commands to be executed are determined in advance by a user and written in a programming language.

Still referring to FIG. 6, "training data," as used herein, is data containing correlations that a machine-learning process may use to model relationships between two or more categories of data elements. For instance, and without limitation, training data 604 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 604 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 604 according to various correlations; correlations may indicate causative and/or predictive links between categories of data elements, which may be modeled as relationships such as mathematical relationships by machine-learning processes as described in further detail below. Training data 604 may be formatted and/or organized by categories of data elements, for instance by associating data elements with one or more descriptors corresponding to categories of data elements. As a non-limiting example, training data 604 may include data entered in standardized forms by persons or processes, such that entry of a given data element in a given field in a form may be mapped to one or more descriptors of categories. Elements in training data 604 may be linked to descriptors of categories by tags, tokens, or other data elements; for instance, and without limitation, training data 604 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 6, training data 604 may include one or more elements that are not categorized; that is, training data 604 may not be formatted or contain descriptors for some elements of data. Machine-learning algorithms and/or other processes may sort training data 604 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 604 to be made applicable for two or more distinct machine-learning algorithms as described in further detail below. Training data 604 used by machine-learning module 600 may correlate any input data as described in this disclosure to any output data as described in this disclosure.

Further referring to FIG. 6, training data may be filtered, sorted, and/or selected using one or more supervised and/or unsupervised machine-learning processes and/or models as described in further detail below; such models may include without limitation a training data classifier 616. Training data classifier 616 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 600 may generate a classifier using a classification algorithm, defined as a processes whereby a computing device and/or any module and/or component operating thereon derives a classifier from training data 604. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 6, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 6, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 6, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm: $l=\sqrt{\sum_{i=0}^{n}a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 6, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 6, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 6, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 6, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 6, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict inter-polated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 6, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 6, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 6, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}:X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation $\sigma$ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 6, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 6, machine-learning module 600 may be configured to perform a lazy-learning process 620 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 604. Heuristic may include selecting some number of highest-ranking associations and/or training data 604 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 6, machine-learning processes as described in this disclosure may be used to generate machine-learning models 624. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 624 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 624 may be generated by creating an artificial neural network, such as a convolutional neural network comprising an input layer of nodes, one or more intermediate layers, and an output layer of nodes. Connections between nodes may be created via the process of "training" the network, in which elements from a training data 604 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 6, machine-learning algorithms may include at least a supervised machine-learning process 628. At least a supervised machine-learning process 628, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include input as described above or through incorporation as inputs, outputs as described above or through incorporation as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 604. Persons skilled in the art, upon reviewing the entirety of this disclosure, will be aware of various possible variations of at least a supervised machine-learning process 628 that may be used to determine relation between inputs and outputs. Supervised machine-learning processes may include classification algorithms as defined above.

With further reference to FIG. 6, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 6, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 6, machine learning processes may include at least an unsupervised machine-learning processes 632. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 632 may not require a response variable; unsupervised processes 632 may be used to find interesting patterns and/or inferences between variables, to determine a degree of correlation between two or more variables, or the like.

Still referring to FIG. 6, machine-learning module 600 may be designed and configured to create a machine-learning model 624 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 6, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 6, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 6, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 6, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 6, one or more processes or algorithms described above may be performed by at least a dedicated hardware unit 636. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 636 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 636 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 636 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 7:
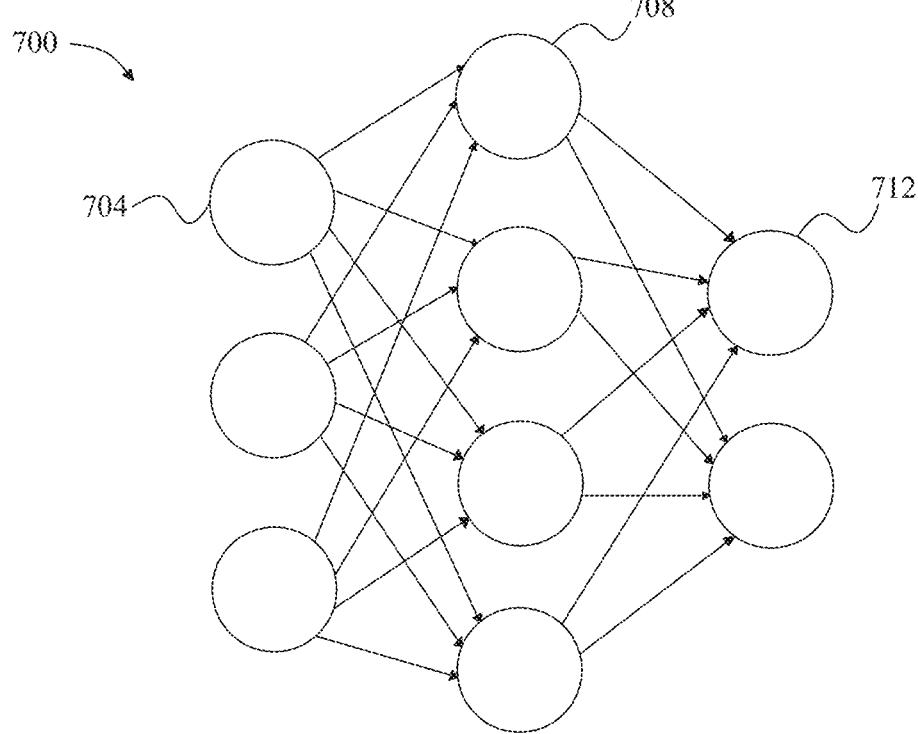
FIG. 7 illustrates an exemplary neural network.

Referring now to FIG. 7, an exemplary embodiment of neural network 700 is illustrated. A neural network 700 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 704, one or more intermediate layers 708, and an output layer of nodes 712. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 8:
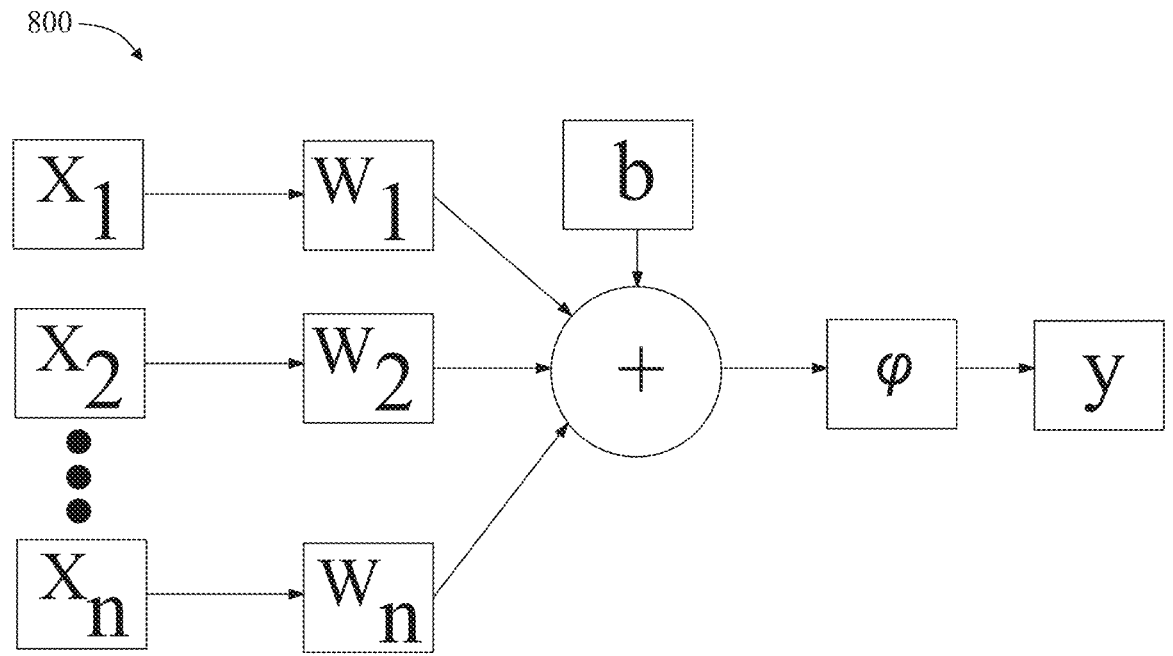
FIG. 8 illustrates an exemplary node of a neural network.

Referring now to FIG. 8, an exemplary embodiment of a node 800 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x) = \tanh^2(x)$, a rectified linear unit function such as $f(x) = \max(0, x)$, a "leaky" and/or "parametric" rectified linear unit function such as $f(x) = \max(ax, x)$ for some a, an exponential linear units function such as $$f(x) = \begin{cases} x & \text{for } x \geq 0 \\ \alpha(e^x - 1) & \text{for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x) = x \cdot \text{sigmoid}(x)$, a Gaussian error linear unit function such as $f(x) = \alpha(1 + \tanh(\sqrt{2/\pi}(x + bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function p, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Now referring to FIG. 9, illustrated is a flow diagram augmented visualization using activity windows. In an embodiment, a method for augmented visualization using activity windows may include receiving image data from an imaging device 905, executing at least a first algorithm on the image data 910, generating a display data structure 915, and displaying, at interactive display device, at the display data structure 920. Further, in some embodiments method 900 may include accepting user input at the interactive display device 925, displaying at primary window, image data associated with a user's input 930, and enabling a user to interact with interactive display device using pan, zoom, and/or other user interface techniques as described throughout this disclosure 935. User input may include selecting and/or highlighting a region of interest of image data, selecting one or more segments of interest from image data present in activity window, and/or when indicating more than one segment of interest choosing to display the selected segments in a composite view.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 10:
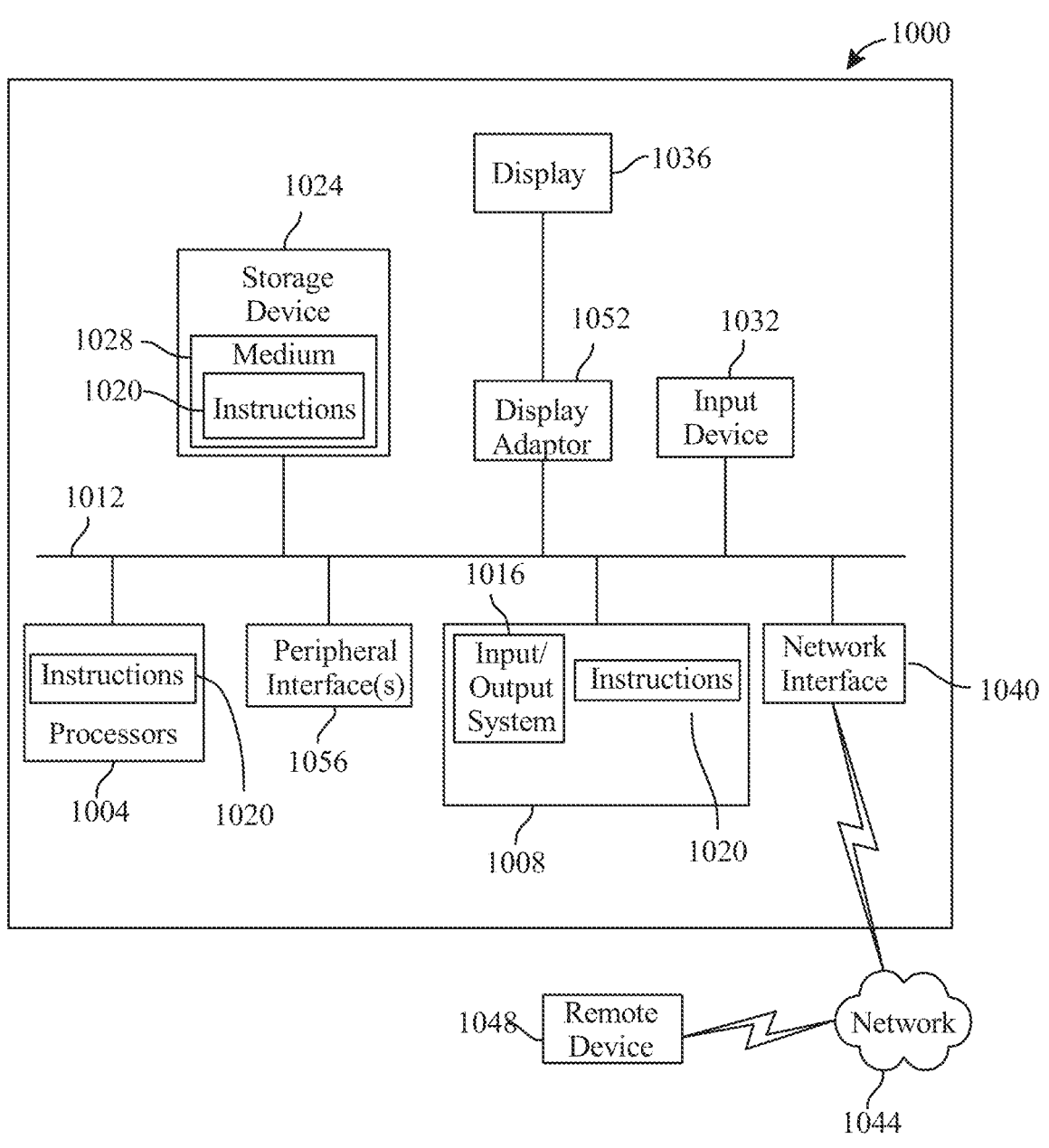
FIG. 10 is a block diagram of a computing system that can be used to implement any one or more of the methodologies disclosed herein and any one or more portions thereof.

FIG. 10 shows a diagrammatic representation of one embodiment of a computing device in the exemplary form of a computer system 1000 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1000 includes a processor 1004 and a memory 1008 that communicate with each other, and with other components, via a bus 1012. Bus 1012 may include any of several types of bus structures including, but not limited to, a memory bus, a memory controller, a peripheral bus, a local bus, and any combinations thereof, using any of a variety of bus architectures.

Processor 1004 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1004 may be organized according to Von Neumann and/or Harvard architecture as a non-limiting example. Processor 1004 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 1008 may include various components (e.g., machine-readable media) including, but not limited to, a random-access memory component, a read only component, and any combinations thereof. In one example, a basic input/output system 1016 (BIOS), including basic routines that help to transfer information between elements within computer system 1000, such as during start-up, may be stored in memory 1008. Memory 1008 may also include (e.g., stored on one or more machine-readable media) instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof.

Computer system 1000 may also include a storage device 1024. Examples of a storage device (e.g., storage device 1024) include, but are not limited to, a hard disk drive, a magnetic disk drive, an optical disc drive in combination with an optical medium, a solid-state memory device, and any combinations thereof. Storage device 1024 may be connected to bus 1012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1024 (or one or more components thereof) may be removably interfaced with computer system 1000 (e.g., via an external port connector (not shown)). Particularly, storage device 1024 and an associated machine-readable medium 1028 may provide nonvolatile and/or volatile storage of machine-readable instructions, data structures, program modules, and/or other data for computer system 1000. In one example, software 1020 may reside, completely or partially, within machine-readable medium 1028. In another example, software 1020 may reside, completely or partially, within processor 1004.

Computer system 1000 may also include an input device 1032. In one example, a user of computer system 1000 may enter commands and/or other information into computer system 1000 via input device 1032. Examples of an input device 1032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1032 may be interfaced to bus 1012 via any of a variety of interfaces (not shown) including, but not limited to, a serial interface, a parallel interface, a game port, a USB interface, a FIRE-WIRE interface, a direct interface to bus 1012, and any combinations thereof. Input device 1032 may include a touch screen interface that may be a part of or separate from display 1036, discussed further below. Input device 1032 may be utilized as a user selection device for selecting one or more graphical representations in a graphical interface as described above.

A user may also input commands and/or other information to computer system 1000 via storage device 1024 (e.g., a removable disk drive, a flash drive, etc.) and/or network interface device 1040. A network interface device, such as network interface device 1040, may be utilized for connecting computer system 1000 to one or more of a variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from computer system 1000 via network interface device 1040.

Computer system 1000 may further include a video display adapter 1052 for communicating a displayable image to a display device, such as display device 1036. Examples of a display device include, but are not limited to, a liquid crystal display (LCD), a cathode ray tube (CRT), a plasma display, a light emitting diode (LED) display, and any combinations thereof. Display adapter 1052 and display device 1036 may be utilized in combination with processor 1004 to provide graphical representations of aspects of the present disclosure. In addition to a display device, computer system 1000 may include one or more other peripheral output devices including, but not limited to, an audio speaker, a printer, and any combinations thereof. Such peripheral output devices may be connected to bus 1012 via a peripheral interface 1056. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for augmented visualization using activity windows,
wherein the system comprises:
at least a processor;
a memory communicatively connected to the at least a processor, wherein the memory stores instructions configuring the processor to:
receive image data from an imaging device;
execute at least a first algorithm on the image data comprising an algorithm configured to determine a quality metric from the image data by implementing a process to correct image data using historical image data and to identify different cell groups in the image data and calculate a fitness measure of the image data and flag the image data, wherein the first algorithm is configured to output annotation data associated with the image data; and
generate a display data structure, wherein the display data structure includes at least:
a primary window; and
an activity window to visualize the image data with overlay of metadata comprising annotation data; and
an interactive display device, wherein the interactive display device is configured to display to a user, the generated display data structure.

2. The system of claim 1, wherein the imaging device comprises an optical scanner.

3. The system of claim 1, wherein the at least a first algorithm comprises one or more of the following algorithms:
an algorithm configured to calculate a fitness measure of the image data and flag the image data accordingly;
an algorithm configured to determine a quality metric for the image data;
an algorithm configured to identify different cell groups in one or more image data; and
an algorithm configured to generate a color gamut correction for one or more image data.

4. The system of claim 1, wherein an activity window further comprises adaptive overlays with metadata at different levels of magnification.

5. The system of claim 4, wherein adaptive overlays further comprises:
transparent masks with overlay information at high magnification;
contours with overlay information at intermediate magnification; and
dots of various sizes with information at lower magnification.

6. The system of claim 1, wherein a user may toggle between annotation data displayed on the activity window at the interactive display device.

7. The system of claim 1, wherein the instructions further configure the processor to:
accept user input, using interactive display device, selecting a region of interest of image data;
display, using the primary window, the selected region of interest of image data; and
enable, using interactive display device, zoom and pan over displayed region of interest.

8. The system of claim 1, wherein the instructions further configure the processor to:

accept user input, using image segmentation tools, multiple segments of interest from display data structure;
composite a virtual composite image from the selected segments of interest; and
display the virtual composite image.

9. The system of claim 1, wherein the activity window and the primary window present adjacent image data, wherein the adjacent image data comprises altered image data.

10. The system of claim 9, wherein the adjacent image data further comprises scanned tissue slides, and the altered image data further comprises scanned tissue slides with different stains.

11. A method for augmented visualization using activity windows,
wherein the method comprises:
receiving image data from an imaging device;
executing at least a first algorithm on the image data comprising an algorithm configured to determine a quality metric from the image data by implementing a process to correct image data using historical image data and to identify different cell groups in the image data and calculate a fitness measure of the image data and flag the image data, wherein the first algorithm is configured to output annotation data associated with the image data; and
generating a display data structure, wherein the display data structure includes at least:
a primary window; and
an activity window to visualize the image data with overlay of metadata comprising annotation data; and
displaying, at interactive display device, the display data structure.

12. The method of claim 11, wherein the imaging device comprises an optical scanner.

13. The method of claim 11, wherein the at least a first algorithm comprises one or more of the following algorithms:
an algorithm configured to calculate a fitness measure of the image data and flag the image data accordingly;
an algorithm configured to determine a quality metric for the image data;
an algorithm configured to identify different cell groups in one or more image data; and
an algorithm configured to generate a color gamut correction for one or more image data.

14. The method of claim 11, wherein an activity window further comprises adaptive overlays with metadata at different levels of magnification.

15. The method of claim 14, wherein adaptive overlays further comprises:
transparent masks with overlay information at high magnification;
contours with overlay information at intermediate magnification; and
dots of various sizes with information at lower magnification.

16. The method of claim 11, wherein a user may toggle between annotation data displayed on the activity window at the interactive display device.

17. The method of claim 11, wherein the method further comprises:
accepting user input, using interactive display device, selecting a region of interest of image data;
displaying, using the primary window, the selected region of interest of image data; and
enabling, using interactive display device, zoom and pan over displayed region of interest.

18. The method of claim 11, wherein the method further comprises:

accepting user input, using image segmentation tools, multiple segments of interest from display data structure;

compositing a virtual composite image from the selected segments of interest; and displaying the virtual composite image.

19. The method of claim 11, wherein the activity window and the primary window present adjacent image data, wherein the adjacent image data comprises altered image data.

20. The method of claim 19, wherein the adjacent image data further comprises scanned tissue slides, and the altered image data further comprises scanned tissue slides with different stains.

* * * * *